United States Patent [19]
Duer

[11] 3,836,272
[45] Sept. 17, 1974

[54] CONNECTING DEVICE WITH EXPANDING SPLINES

[75] Inventor: Morris J. Duer, Lansing, Mich.

[73] Assignee: General Motors Corporation, Detroit, Mich.

[22] Filed: July 2, 1973

[21] Appl. No.: 375,918

[52] U.S. Cl. ............................................. 403/359
[51] Int. Cl. ............................................. F16b 7/00
[58] Field of Search .......... 403/359, 248, 259, 258, 403/98

[56] References Cited
UNITED STATES PATENTS

| | | | |
|---|---|---|---|
| 562,055 | 6/1896 | Wellman | 403/258 X |
| 1,490,649 | 4/1924 | Vanderbeek | 403/359 X |
| 2,052,241 | 8/1936 | Morgan | 403/359 |
| 3,335,580 | 8/1967 | Simpson | 403/359 X |

*Primary Examiner*—Geo. V. Larkin
*Attorney, Agent, or Firm*—F. J. Fodale

[57] ABSTRACT

A bearing arrangement for a shaft has duplex bearings preloaded by a companion member drivingly connected to the shaft. Cooperating, straight, relatively slidable splines on the companion member and shaft are urged into an interference fit by a tapered plug threaded into and resiliently expanding the bored, splined end of the shaft. Removal of the plug automatically releases the interference fit thereby facilitating removal of the companion member and disassembly of the bearing arrangement.

1 Claim, 3 Drawing Figures

CONNECTING DEVICE WITH EXPANDING SPLINES

This invention relates generally to a device for connecting a companion member to a shaft or the like and to such a device for adjusting the preload in a set of duplex bearings which rotatably support the shaft.

The device uses cooperating internal splines on the companion member and external splines on the shaft to provide a driving connection therebetween and is of the anti-backlash type. Previously, such devices have generally used a companion member with either helical or tapered splines pressed onto a shaft with straight parallel splines (or vice-versa) to provide anti-backlash characteristics. With such devices, however, once the companion member is secured to the shaft, it is thereafter difficult to remove the companion member from the shaft because the interference fit between the internal and external splines produced by the pressing operations is not automatically released. Consequently, it takes as much force to remove the companion member as it initially takes to make the connection.

An object of this invention is to provide a device for making a high quality, lash free, spline drive connection between a companion member which allows easy removal of the companion member from the shaft.

Another object of this invention is to provide such a device for adjustably preloading a bearing mounting arrangement by a companion member on the shaft which is easily removed from the shaft facilitating disassembly of the bearing arrangement.

Other objects and features of the invention will become apparent to those skilled in the art as the disclosure is made in the following detailed description of a preferred embodiment of the invention as illustrated in the accompanying sheet of drawings in which.

Figure 1:
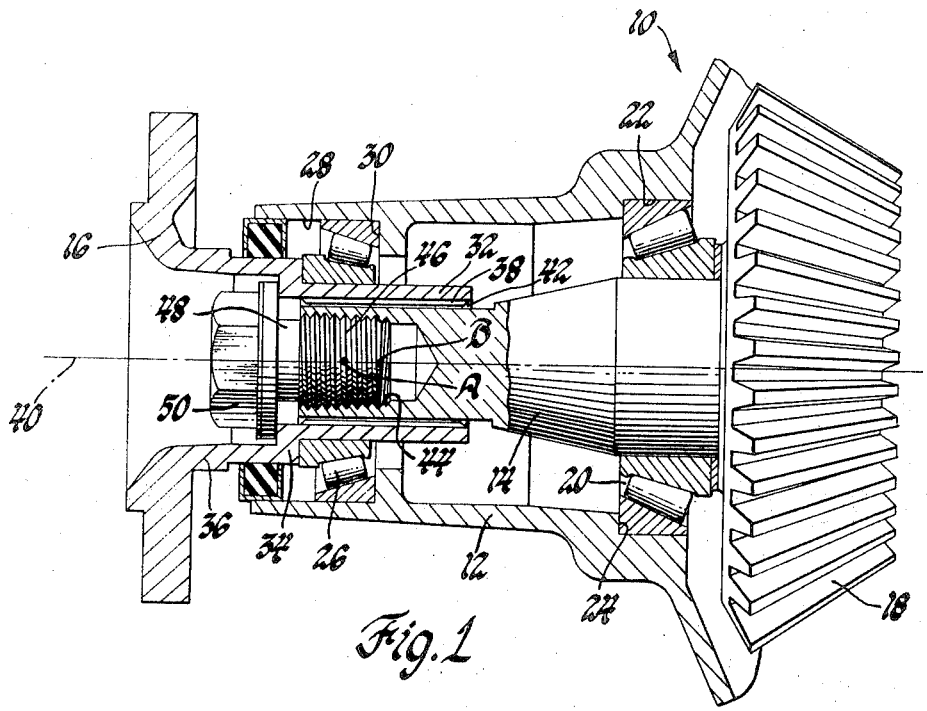
FIG. 1 is a section through a portion of an automotive differential showing a bearing arrangement which includes a device in accordance with this invention.

Referring now to the drawings and more specifically to FIG. 1, an automotive differential indicated generally at 10 comprises a housing 12 in which is rotatably mounted an input shaft 14. The input shaft has a companion member 16 connected to its left end for connecting the input shaft to a propeller shaft (not shown) through a universal joint (not shown). The right end of the input shaft has an integral beveled driving pinion 18 for driving a differential carrier ring gear (not shown).

The shaft 14 is rotatably supported and centered in the housing 12 by a set of duplex bearings which for purposes of illustration are shown as tapered roller bearings, although any angular contact type of bearing having their respective roller axes oppositely inclined may be used. The right bearing 20 has its outer race seated in a counter bore 22 in the housing against an internal radial shoulder 24. The inner race of the bearing 20 is mounted on an enlarged end portion of the input shaft 14 and exerts a thrust force on the driving pinion 18 through an intermediary shim. The left bearing 26 has its outer race disposed in the bore 28 of the housing 12 against a second internal shoulder 30 adjacent the left end of the housing. The inner race for the left bearing 26 is mounted on a cylindrical, smaller diameter portion 32 of the companion member 16 against a radial wall 34 connecting the cylindrical, smaller diameter portion 32 to an enlarged flanged portion 36.

The companion member 16 has straight internal splines 38 in the cylindrical, smaller diameter portion 32 which are parallel to the axis 40 on which the companion member 16 and shaft 14 are coaxially disposed in the housing 12. The internal splines 38 engage straight external splines 42 on the left end portion of the shaft 14 also parallel to the axis 40 providing a driving connection therebetween.

The left end portion of the shaft 14 has an axially disposed, blind ended, inwardly tapered bore 44 in which is threadably secured a tapered shank 46 of a plug 48. A head 50 on the plug 48 engages the radial wall 34 on the companion member locating the companion member 16 on the shaft 14 and preloading the bearings 20 and 26.

Figure 2:
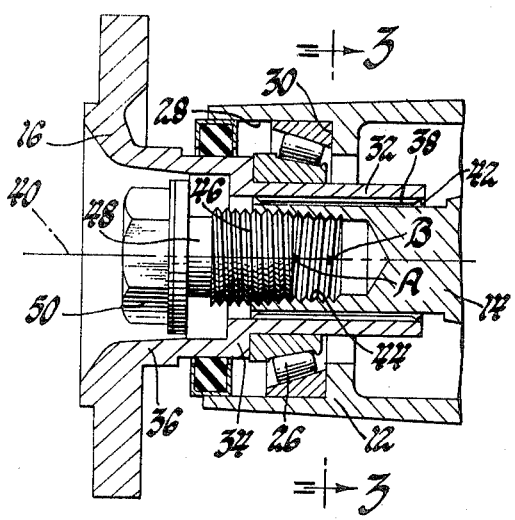
FIG. 2 is a view similar to a portion of FIG. 1 showing the relationship of various parts of the device shown in FIG. 1 prior to complete assembly.
Figure 3:
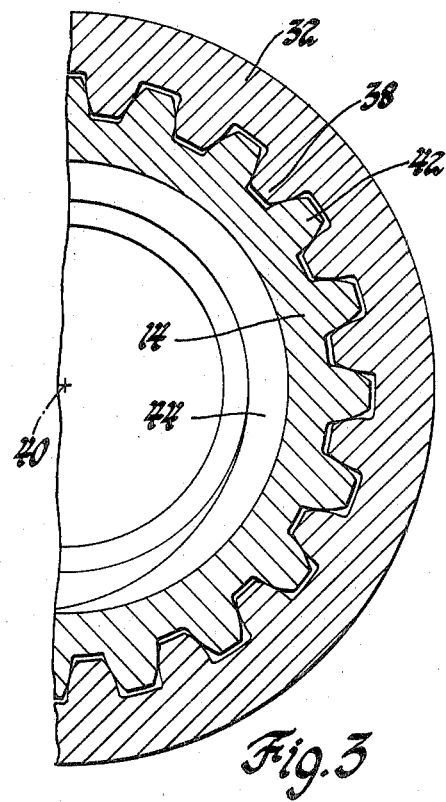
FIG. 3 is a section taken along the line 3—3 of FIG. 2.

The manner in which the plug 48 secures the companion member to the shaft by the plug 48 is an important feature of this invention. When the plug 48 is partially threaded into the bore 44 with the end of the shank located at point A as shown in FIG. 2, the left end portion of the shaft 14 is in a free, unexpanded state. The splines 38 and 42 are designed with a sliding fit and the companion member 16 freely translates on the left end portion of the shaft. As the tapered shank 46 is further threaded into the tapered bore 44, the end portion of the shaft 14 being a relatively thin annulus is radially expanded urging the companion member 16 toward the right and producing an increasing interference fit between the splines 38 and 42. The splines 38 and 42 are preferably of involute form with the fit therebetween determined at the pitch diameter. Preferably the tapered shank 46 and the tapered bore 44 are equally tapered and have identical threads which intimately engage with matching pitch diameters when the end of the plug 48 is at A, the point of incipient radial expansion of the end portion of the shaft 14.

In the completely assembled condition, the head 50 on the plug 48 exerts an axial force on the companion member 16 toward the right which preloads the bearings 20 and 26. The end of the threaded shank 46 is at point B approximately ¼ inch inwardly from the point A producing an adequate interference fit between the splines 38 and 42 to remove any lash and provide a high quality drive connection between the companion member 16 and the shaft 14. The bearing preload can be adjusted by selecting the torque applied to the plug 48 during assembly. After assembly, the bearing preload can be further adjusted by turning the plug one way or the other.

The companion member 16 is easily removed from the shaft 14 simply by removing the plug 48 which releases the interference fit between the spline and sliding the companion member 16 off the shaft 14. Disassembly of the bearing mounting arrangement is thus also facilitated.

I wish it to be understood that I do not desire to be limited to the exact details of construction shown and described, for obvious modifications will occur to a person skilled in the art.

I claim:

1. The combination comprising, a housing having axially spaced, internal, radial shoulders, a shaft having an axis and external splines parallel to said axis at an end portion of said shaft disposed in said housing, a companion member having an axis and internal splines parallel to said axis, coaxially disposed about said end portion of said shaft with said internal splines engaging said external splines with a sliding fit when said shaft is in a free state, a first angular contact bearing having an outer bearing race mounted in said housing against one of said internal radial shoulders thereof and an inner race mounted on said companion member against a shoulder thereof outboard of said one radial shoulder, a second angular contact bearing having an outer race mounted in said housing against another of said radial shoulders thereof and an inner race mounted on said shaft against a shoulder thereof outboard of said other radial shoulder, said first and second angular contact bearings having rollers on oppositely inclined axes respectively to center said shaft in said housing, said end portion of said shaft having an axially disposed tapered bore with internal threads, and a plug having a tapered shank with external threads engaging said internal threads in said tapered bore beyond a point at which said external threads have a common pitch diameter with said internal threads and said plug having a head which transmits an axial force to said inner race of said first angular contact bearing through said companion member toward said second tapered bearing whereby said end portion of said shaft is resiliently expanded radially outwardly to provide an interference fit between said external splines thereon and said internal splines in said companion member to provide an anti-backlash spline connection therebetween and said first and second angular contact bearings are adjustably preloaded.

* * * * *